United States Patent
Hanners

(10) Patent No.: US 10,002,545 B2
(45) Date of Patent: Jun. 19, 2018

(54) SYSTEM AND METHOD FOR CONTROLLING GAMING TECHNOLOGY, MUSICAL INSTRUMENTS AND ENVIRONMENTAL SETTINGS VIA DETECTION OF NEUROMUSCULAR ACTIVITY

(71) Applicant: Jennifer Robin Hanners, Lubbock, TX (US)

(72) Inventor: Jennifer Robin Hanners, Lubbock, TX (US)

( * ) Notice: Subject to any disclaimer, the term of this patent is extended or adjusted under 35 U.S.C. 154(b) by 361 days.

(21) Appl. No.: 14/181,082

(22) Filed: Feb. 14, 2014

(65) Prior Publication Data

US 2014/0302471 A1    Oct. 9, 2014

Related U.S. Application Data

(60) Provisional application No. 61/809,035, filed on Apr. 5, 2013, provisional application No. 60/998,303, filed on Oct. 10, 2007.

(51) Int. Cl.
   *G09B 19/00*    (2006.01)

(52) U.S. Cl.
   CPC .................. *G09B 19/003* (2013.01)

(58) Field of Classification Search
   CPC .......... A63F 2300/1012; A61B 5/0488; A61B 5/486; A61B 2505/09; G09B 19/0038; G09B 15/00; A63B 2230/00
   USPC ....................................... 434/247
   See application file for complete search history.

(56) References Cited

U.S. PATENT DOCUMENTS

| | | | | |
|---|---|---|---|---|
| 5,679,004 A | * | 10/1997 | McGowan | A63B 69/00 434/247 |
| 6,413,190 B1 | * | 7/2002 | Wood | A61B 5/1071 463/36 |
| 2001/0049482 A1 | * | 12/2001 | Pozos | A61B 5/1107 600/587 |
| 2004/0267331 A1 | * | 12/2004 | Koeneman | A61H 1/02 607/49 |
| 2007/0148624 A1 | * | 6/2007 | Nativ | A63B 24/0003 434/258 |

(Continued)

*Primary Examiner* — Sam Yao
*Assistant Examiner* — Michael Humphrey
(74) *Attorney, Agent, or Firm* — Sarah Hegi Simpson; Roman Aguilera, III

(57) ABSTRACT

A system and method for controlling gaming technology, musical instruments and environmental settings via detection of neuromuscular activity are disclosed herein. The disclosed system generally comprises a sensor grid coupled to a user; a base station configured to receive neuromuscular activity inputs from one or more sensors in said sensor grid, determine whether said neuromuscular activity inputs received from said one or more sensors is within a calibrated boundary value for an activity associated with each of said one or more sensors, and instruct a physical device or software to perform said activity when said neuromuscular activity input received from said one or more sensors is within said calibrated boundary value for the activity associated with each of said one or more sensors; and at least one said physical device or said software being configured to receive instructions from said base station. The disclosed system allows a user to perform an activity that the user might otherwise be unable to perform.

12 Claims, 2 Drawing Sheets

(56) References Cited

U.S. PATENT DOCUMENTS

| | | | |
|---|---|---|---|
| 2007/0282228 A1* | 12/2007 | Einav | A61B 5/7475 601/33 |
| 2009/0018610 A1* | 1/2009 | Gharib | A61B 5/04001 607/48 |
| 2010/0075806 A1* | 3/2010 | Montgomery | A63B 24/0003 482/8 |
| 2012/0142416 A1* | 6/2012 | Joutras | A63B 21/4047 463/36 |
| 2013/0123568 A1* | 5/2013 | Hamilton | A61N 1/36003 600/13 |
| 2013/0211259 A1* | 8/2013 | Komistek | G06F 19/3443 600/440 |
| 2014/0343392 A1* | 11/2014 | Yang | A61B 5/04011 600/393 |

\* cited by examiner

SYSTEM AND METHOD FOR CONTROLLING GAMING TECHNOLOGY, MUSICAL INSTRUMENTS AND ENVIRONMENTAL SETTINGS VIA DETECTION OF NEUROMUSCULAR ACTIVITY

CROSS-REFERENCE TO RELATED APPLICATIONS

This application is a continuation-in-part of U.S. patent application Ser. No. 12/287,522, filed Oct. 10, 2008, which claims the benefit of U.S. Provisional Patent Application No. 60/998,303, filed Oct. 10, 2007. In addition, this application is related to and claims priority from earlier filed U.S. Provisional Patent Application No. 61/809,035, filed Apr. 5, 2013. The entire contents of all earlier filed applications are incorporated herein by reference.

BACKGROUND OF THE INVENTION

The present invention relates to a system controlled by neuromuscular activity. More particularly, the present invention relates to a system and method that utilize a user's neuromuscular response to perform an activity that the user might otherwise be unable to perform. Such activities include the control of electronic games (i.e., video games or other computerized video-displayed interactive programming), the control of musical instruments (i.e., electronic musical instruments and computerized non-electronic musical instruments), and the control of environmental settings (e.g., room lighting, climate control, etc.) via the detection of neuromuscular activity.

In the United States, due to overall improved medical care, the mortality rate for victims of severe traumatic injury has greatly decreased. Subsequent to surviving such injuries, however, patients often suffer severe neuromuscular impairments (i.e., impairments that affect the muscles and/or the direct nervous system control of the muscles) and are frequently left severely physically and, on many occasions, cognitively, impaired. In other cases, individuals may suffer from congenital defects that inhibit optimal development of neuromuscular function, motor skills, or cognitive skills.

Conventional treatment (e.g., physical, occupational or cognitive therapy sessions) for patients surviving severe physical and/or cognitive trauma, or patients with a congenital acquisition of neuromuscular, motor or cognitive deficits, involves participation in activities that are generally repetitive, grueling, and uninspiring. For patients who already are depressed or having trouble living their normal lives, such a regimen of rehabilitation and tedious treatment sessions can be difficult to follow. Additionally, many patients become exceedingly focused on their disability rather than the achievement of rehabilitative goals, yielding less incentive to participate in therapeutic activity.

Moreover, due to the high cost of physical, occupational, and cognitive therapy sessions and the limited number of licensed therapists or treating professionals, patients' access to professionally supervised sessions is limited. In between such sessions, patients may find it a daunting or impossible task to complete assigned therapeutic activities on their own when the treating professional is not present. Also, in between sessions, patients may be unmotivated to participate in a prescribed therapy regimen that draws focus to their limitations and offers little recognition or reward for therapeutic gain.

While the present invention may be used with patients suffering from a wide range of impairments or even with users suffering from no impairment at all, the disclosed system and method are especially designed for use with patients suffering from an impairment that severely limits the patient's ability to voluntarily move one or more body parts (e.g., patients suffering from paresis or paralysis). Patients suffering from such severe impairments are unable to engage in many activities that they once enjoyed, such as playing electronic games or playing musical instruments.

In regards to electronic games, users typically operate electronic games on a computing device by using a control (e.g., a handheld controller, computer keyboard, mouse, etc.) to manipulate game characters or other aspects of the game. Recently, camera-controlled computing devices have been introduced for operating electronic games without the use of conventional controls. Such camera-controlled systems, however, rely on gross movements from large muscle groups and whole body movements for controlling an avatar, wherein the avatar's motion in a virtual space mimics the user's motion in a physical space. In regards to typical musical instruments, users must manipulate parts (e.g., keys, pedals, strings, etc.) of the musical instrument in order to play the instrument. Clearly, patients suffering from paresis, paralysis, or another impairment that severely limits the patients' voluntary movements, are unable to engage in such activities that require manipulation of a control, gross body movements, or manipulation of a musical instrument.

In view of the foregoing, there exists an unmet need for a system that provides an avenue for patients who are suffering from impairments that severely limit their voluntary movements to contribute to their overall rehabilitation. Additionally, there is a need for a system that increases the positive results between professionally supervised sessions, by allowing patients to play an electronic game (such as a video game or other computerized video-displayed interactive programming) or a musical instrument (such as an electronic musical instrument or a computerized non-electronic musical instrument), wherein the electronic game or musical instrument is operable via detection of residual neuromuscular function. Furthermore, there is a need for a system, for patients suffering from severe neuromuscular impairments, that allows the patients to control environmental settings, such as turning lights in a room on and off, via residual neuromuscular activity.

It is to be understood that the disclosed invention is not limited in its application to the details of construction or to the arrangement of the components or steps set forth in the following description or illustrated in the drawings. The various systems and methods of use of the invention are capable of numerous embodiments and of being practiced and carried out in various ways, which will be obvious to those skilled in the art once they review this disclosure. It should also be understood that the phraseology and terminology employed herein are for the purpose of description and should not be regarded as limiting.

As such, those skilled in the art will appreciate that the conception, upon which this disclosure is based, may readily be utilized as a basis for designing other devices, methods and systems for carrying out the several purposes of the disclosed system. It is important, therefore, that the objects and claims be regarded as including such equivalent construction and methodology insofar as they do not depart from the spirit and scope of the present invention.

OBJECTS AND SUMMARY OF THE INVENTION

The system herein described and disclosed provides a novel and unique method for controlling gaming technology (e.g., video games) and electronic or computerized musical instruments via detection of neuromuscular activity. Furthermore, the disclosed system provides a novel and unique method for controlling environmental settings via detection of neuromuscular activity. The disclosed system is able to detect even residual neuromuscular function by employing sensors configured to detect motor neuron activity, including trace motor neuron activity that does not result in muscular twitch or movement. The detected motor neuron activity acts as a pathway for the disclosed user interface.

The disclosed system provides a means for users to perform tasks that the users would otherwise be unable to perform by allowing the users to interact with the system by using even trace motor neuron activity that never advances to a functional level. As a result, users can use the disclosed system to manipulate their environment or to engage a game or musical instrument even though the user may lack control of voluntary movements. Not only does the disclosed system provide a means for users to perform tasks that the users would otherwise be unable to perform, but the system may also lead to neuromuscular functional gain through re-education of the neural system and adaptive neural mapping.

Accordingly, it is an object of the disclosed invention to offer users physical and emotional recovery following a debilitating injury. It is a further object of the present invention to offer gaming, control of musical instruments, or control of environmental settings to individuals suffering impairments that severely limit voluntary movements. Another object of the invention is to create an affordable method of gaming and musical instrument activation through the use of intricately-designed software and hardware that interface with a conventional game console, computer, smart phone or other computing device, or an electronic or computerized musical instrument. A further object of the invention is to stimulate cognition through choices required for game success or instrument activation. Still another object of the invention is to integrate the use of biofeedback with gaming and musical instruments so that nerve function and other biofeedback measures can be measured or tracked. Yet another object of the invention is to integrate the use of neuromuscular electrical stimulation into gaming and control of musical instruments to activate muscle contraction and/or nerve stimulation for incremental rehabilitation over time. Still yet another object of the invention is to offer a system that engages both affected and unaffected parts of the body for use in individuals with unilateral injuries. Finally, another object of the invention is to offer a system that calibrates to the user's level of neuromuscular function and responds to available neuromuscular activity to provide for full engagement of a game target or musical instrument in response to electrical activity of nerves and muscles or in response to limited muscle movements.

Further objectives of this invention will be described in the following part of the specification, wherein detailed description is for the purpose of fully disclosing the invention without placing limitations thereon. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

Figure 1:
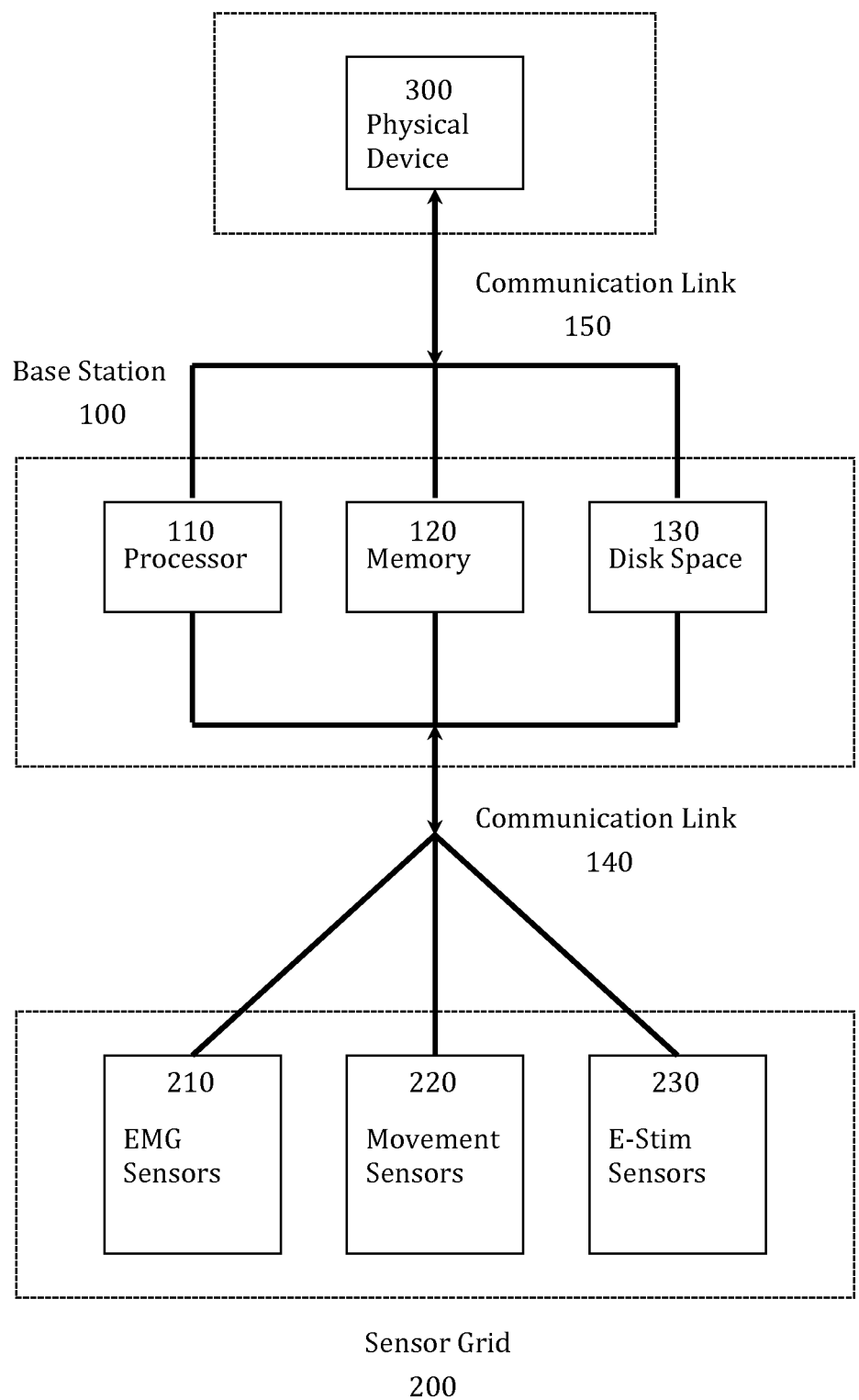
FIG. 1 is a component layout view of the system configured for controlling an electronic game, musical instrument, or environmental setting in accordance with the teachings of the present disclosure.

Neuromuscular activity describes the activity occurring in the feedback loop of interaction between the nerves and muscles. In the nervous system, efferent nerves, commonly known as motor neurons, carry nerve impulses away from the central nervous system to effectors such as muscles. In order to produce movement, motor neurons carry electrical signals from the central nervous system to the muscles. Impairment of neuromuscular function can result from many congenital or acquired defects that impair the functioning of the muscles either directly, being pathologies of the muscle, or indirectly, being pathologies of nerves or neuromuscular junctions. The disclosed system calibrates to the neuromuscular function of a user and responds to available neuromuscular activity, even if neuromuscular function is severely impaired or limited, to provide for control of an electronic game, musical instrument, or environmental setting, by utilizing sensors that detect or elicit neuromuscular activity, as well as a user interface that is operable via the detection of neuromuscular activity.

The disclosed system detects neuromuscular activity by detecting electrical activity in motor neurons. Electrical activity can be directly detected via electromyography sensors. Electromyography (EMG) is a technique for evaluating and recording the electrical activity produced by motor neurons and muscle cells. Using EMG sensors, neuromuscular activity can be detected by measuring electrical activity in motor neurons, independent of muscle movement. An electromyograph uses sensors to detect muscle action potentials from underlying skeletal muscles that initiate muscle contraction. EMG sensors detect the electrical potential generated by muscle cells when these cells are neurologically activated. EMG can be used for evaluating muscle activation and can also be used to sense isometric muscular activity where no movement is produced. Even trace nerve activity, which may not be strong enough to recruit muscular activity, is detectable via the EMG sensors utilized with the disclosed system. It is noted that the EMG sensors employed are preferably surface EMG (sEMG) sensors. However, other modes of the invention are envisioned wherein intramuscular sensors may be employed and are anticipated.

Additionally, electrical activity can be indirectly detected via movement sensors (e.g., motion sensors such as accelerometers, rotation sensors such as gyroscopes, etc.). While the present invention is aimed at detecting neuromuscular activity by measuring electrical activity in motor neurons (independent of muscle movement), sensors for detecting movement may nevertheless be utilized with the disclosed system because movement sensors indirectly detect the presence of electrical activity in motor neurons, as muscles require electrical activity in motor neurons in order to move.

Preferably, the movement sensors are able to detect limited muscle movements. As used herein, the term "limited movements" refers to small or even trace muscle movements such as movements caused by contraction of a muscle or small muscle movements that occur in the hands, wrists, fingers, feet, toes, etc.

Alternatively, neuromuscular electrical stimulation ("e-stim") can be implemented to elicit neuromuscular activity. Electrical stimulation induces muscle contraction using electrical impulses. The impulses are generated by an e-stim unit and are delivered through sensors on the skin in direct proximity to the muscles to be stimulated. The impulses mimic the action potential coming from the central nervous system, causing the muscles to contract. In addition to being used to provide for engagement of a game, musical instrument, or environmental setting, or being used to enhance game performance or musical prowess, a system utilizing e-stim sensors can provide for incremental neuromuscular rehabilitation over time, even when used by patients suffering from paresis or paralysis.

In one embodiment of the disclosed invention, in order to control an electronic game, musical instrument or environmental settings, the user is equipped with body-engaged sensors such as EMG sensors 210, movement sensors 220, and/or e-stim sensors 230. As used herein, the term "body-engaged sensors" refers to sensors that are attached to or somehow engaged with the user's body, such as sensors applied directly to the user's body, or sensors attached to, encased within, or otherwise incorporated into gear (e.g., equipment, clothing, accessories, elastic therapeutic tape, a handheld controller, exoskeleton, etc.) worn by or in contact with the user (hereinafter, also referred to as "sensor gear").

The disclosed system may employ sensor gear, which includes one or a plurality of sensor components (e.g., EMG sensors 210, movement sensors 220, and e-stim sensors 230) that detect neuromuscular activity. The sensor components of the sensor gear act as the controller of the electronic game, musical instrument, or environmental setting. The sensor components are operatively engaged to a computing device having software onboard for operating an electronic game, musical instrument, or environmental setting. Certain types of gear incorporating movement sensors are already available in the form of gloves, sleeves, etc., which have sensors (e.g., accelerometers and gyroscopes) that can detect limited movements and, thus, can indirectly detect electrical activity of skeletal muscles. Such gear may be employed with the disclosed system and method to detect neuromuscular activity.

New types of sensor gear incorporating movement sensors, EMG sensors, and/or e-stim sensors may be developed and customized for use with the disclosed invention. For example, the creation of sensor gear such as elastic therapeutic tape (e.g., Kinesio® tape) having movement sensors 220, EMG sensors 210, and/or e-stim sensors 230 attached to or incorporated within the elastic therapeutic tape, may provide a means for detection or elicitation of neuromuscular activity that may be used with the disclosed system and method.

In another embodiment, the modification, refinement, or creation of adaptive equipment (e.g., a wheelchair with upper extremity supports or lower extremity supports) which includes sensor components attached to or encased within the adaptive equipment, may provide another means for detection or elicitation of neuromuscular activity that may be used with the disclosed invention. Another example of sensor gear includes a moveable upper extremity support device attached to a wheelchair. The user's arm may be placed within a garment such as a sleeve or within a specialized exoskeleton device that includes sensor components to provide another means for detection or elicitation of neuromuscular activity. Exoskeleton devices are constantly being developed and improved upon. The disclosed invention may use such exoskeleton devices, whether it be an upper extremity exoskeleton device or a lower extremity exoskeleton device, that include sensor components as another means for detection or elicitation of neuromuscular activity. In other embodiments, less sophisticated sensor gear, such as a glove or sleeve with sensor components, may also be used with the disclosed invention. Devices incorporating necessary sensor components along with associated communication hardware and software, which may be developed as a result of the invention herein, are considered to be within the spirit and scope of the present invention.

In another embodiment, body-engaged sensors may be applied directly to the user's body. For example, body adhesives are available, for medical usage as well as other uses, which are deemed suitable for attaching sensors to various areas of the body. Such body adhesives are effective for adhering sensors to the body during use and are easily removed when desired. Applying sensors directly to the user's body will allow the user or a treating professional to selectively position the sensors on the desired muscles or muscle groups and will eliminate or reduce the need to employ cumbersome sensor gear such as equipment, clothing, accessories, etc. Nevertheless, modes of the invention are still envisioned wherein the user utilizes sensor gear including sensor components for achieving the various features and goals of the present invention by providing for control of a game or musical instrument through detection neuromuscular activity, as will be appreciated by those skilled in the art.

Additionally, it is anticipated that other sensor technology may be configured for use with the task at hand. For example, specialized cameras able to detect limited muscle movements may be employed to detect neuromuscular activity without employing body-engaged sensors. Alternatively, one or a plurality of cameras may be employed in addition to body engaged sensors for detecting neuromuscular activity (i.e., by directly detecting limited muscle movements and thereby indirectly detecting electrical activity of muscles).

As described in more detail below, before playing a game, engaging a musical instrument, or manipulating an environmental setting, the sensors and user interface are calibrated to respond to the level of neuromuscular activity that the user can produce. Neuromuscular activity can be detected and measured using several different parameters. In one embodiment using EMG sensors 210, neuromuscular activity is detected and measured by the duration or the length of time of the neuromuscular response. For example, the system can be calibrated to control a game, instrument or setting so that it requires the duration of the electrical impulse to be, e.g., greater than 300 milli-seconds, in order to allow the detected neuromuscular activity to engage or manipulate the game, instrument or setting. As will be obvious to the skilled artisan, any time period could be used and the time periods may be changed depending on the user's individual level of neuromuscular function.

Additionally, EMG sensors 210 can detect the intensity of neuromuscular activity and measure the amplitude of the electrical impulse, which is an indicator of the number of motor neurons active during the response. For example, the system can be calibrated to control a game, instrument or setting so that it requires the amplitude of the motor impulse to be greater than 0.1 milli-amperes, in order to allow the detected neuromuscular activity to engage or manipulate the game, musical instrument or environmental setting. As will be obvious to the skilled artisan, any amplitude could be used and the required amplitude may be changed depending on the user's individual level of neuromuscular function. The sensitivity of EMG sensors allows for measurement of very limited amplitude and duration signals.

In another embodiment, movement sensors 220 can be calibrated to detect and measure neuromuscular activity. For example, neuromuscular activity may be detected by the duration of the neuromuscular response (i.e., the duration of the movement), by the range of motion of the response, by the number of repetitions of a response, or by any other desirable measurable response that can be detected or measured by movement sensors.

Since e-stim sensors 230 elicit neuromuscular activity, once the user sets specific calibration thresholds (i.e., the baseline neuromuscular response required to control the system), the user is able to utilize e-stim sensors to reach the required calibration threshold in order to control the system.

Once neuromuscular activity is detected or elicited by the sensors, the system responds to the calibration thresholds (e.g., the required duration or intensity of the neuromuscular response) set by the user or by a treating professional at user set-up. The calibration thresholds may be different for each user depending on the user's individual level of neuromuscular function. Additionally, the calibration thresholds may be changed by the user as the user's neuromuscular function improves or if the user's neuromuscular function worsens.

Once the calibration thresholds are determined, the sensor or sensors, configured as the control of the system, are mapped to operate a specific function of a game (e.g., move a character forward, backward, up, or down; force a character to jump; fire a weapon; etc.), or a specific function of a musical instrument (e.g., play a certain key or note; depress a sustain pedal; etc.), or a specific function of an environmental setting (e.g., turn lights on or off; dim lights; make room temperature warmer or colder; etc.). In a preferred embodiment of the disclosed invention, game or musical instrument activation will be dynamic versus "on" and "off." In other words, a character's actions in a game, the volume of a music note when engaging a musical instrument, the length of depression of a sustain pedal of an electronic keyboard, etc. will be changed based on the duration or intensity of the neuromuscular response, yielding the ability to not only activate and control the system but also to control the dynamic of the response.

In another embodiment, in addition to mapping each sensor to control a specific action for a game, musical instrument, or environmental setting, the sensors may also be mapped to a specific location on the user's body. In such an embodiment, calibration may be completed on a configuration screen of a video display that provides anatomical images of a human body that can be selected by the user in order to map sensors to specific body parts, which allows for detection and measurement of neuromuscular function of specific body parts. A baseline can be obtained based on neuromuscular activity detected by each sensor mapped to a specific body part, and as neuromuscular function improves or worsens for a specific body party, a comparison between the baseline and subsequently detected neuromuscular activity can be monitored, measured and tracked.

An example of this sensor mapping might proceed as follows: (1) Attach one or more body-engaged sensors to the desired area or areas of the user's body. (2) Once the body-engaged sensors have been attached to the user's body, establish communication between each sensor and a computing device and/or software. (3) Once communication is achieved from each sensor, establish a calibration threshold for each sensor. (4) Map each sensor to a specific location on the user's body (e.g., by matching sensors with an anatomical image on a configuration screen). (5) Map each sensor to control a specific function (e.g., fire, move up, move down, go forward, etc. for games; or playing certain notes, dynamically depressing a sustain pedal, etc. for musical instruments; or control of certain switches or buttons for manipulating environmental settings).

For example, in regards to a video game application, a sensor mapped to a user's index finger could be mapped to control firing of a weapon, a sensor mapped to a user's calf muscle could be mapped to control forward movement of a character, etc.

In one embodiment of the disclosed system, the system reacts to neuromuscular activity through control of an electronic game, musical instrument or environmental setting, and the user is provided with feedback of his or her neuromuscular function through achievement of gaming targets or activities, or through response of a musical instrument or environmental setting control.

In another embodiment, neuromuscular activity detected by sensors may be tracked, measured and monitored by the disclosed system. In such an embodiment, once each sensor has been mapped to perform a specific function (and, perhaps, once each sensor has been mapped to a specific location on the user's body), the user's neuromuscular function can be tracked by software monitoring the neuromuscular activity detected by each individual sensor. While playing an electronic game or musical instrument, the software can be configured to continuously track, measure and monitor the user's neuromuscular response for improvement or decline in neuromuscular activity and thereby determine the user's progress. Additionally, when employed with a wide area network connection, such as an Internet connection, the user's profile can be stored on a remote server. Thereafter, the user's progress and performance, as determined by sensor detection of neuromuscular activity, can be transmitted to a remote server. This would allow a remote treating professional to monitor the user's progress in achieving increased neuromuscular function. Additionally, the calibration thresholds, game levels, intensity, etc. could all be adjusted by the user or the treating professional according to the user's progress to continually adapt the game to the user's abilities. In this manner, a user's progress can be tracked and the game or program employed can be continually customized for both maximum enjoyment and to encourage improvement in the user's level of neuromuscular function.

The disclosed system, which is controlled via detection of neuromuscular activity, can be used with many different applications. While only a few applications are described in detail herein, one skilled in the art will appreciate that the disclosed system is not limited to the applications described below.

In one embodiment, the disclosed system is configured to control an electronic game via detection of neuromuscular activity. The electronic game can be designed from the ground up as a new system to provide a game-type environment that utilizes sensors, which detect or elicit neuromuscular activity, and a user interface controlled by neuromuscular activity. Neuromuscular activity, including trace or residual neuromuscular activity, may be detected utilizing EMG sensors 210 and/or movement sensors 220. Additionally, e-stim sensors 230 may be used with the disclosed system to elicit neuromuscular activity. While using the disclosed system, the employment of e-stim to activate neuromuscular activity can allow a user to achieve different or higher game targets or levels by allowing the user to perform a particular function that the user is having difficulty with in a game. For example, if a game is configured so that neuromuscular activity detected in the user's calf muscle causes a character on the screen to jump, e-stim sensors 230 may be positioned on the user's calf muscle and the user can engage the e-stim unit to elicit neuromuscular activity in the user's calf muscle which would thereby force the character on the screen to jump.

Rather than using conventional controllers (e.g., a handheld controller, computer keyboard, mouse, etc.) with an electronic game, EMG sensors 210, movement sensors 220 and e-stim sensors 230 are used to detect or elicit neuromuscular activity and, thus, the sensors are configured to operate as the controller of the electronic game. As further explained above, specific gaming actions are mapped to specific sensors, which control or elicit movement of a cursor, character or other digitally-depicted playing component of the game (e.g., causing movement forward, backward, up, and down; firing a weapon; jumping; etc.).

In another preferred embodiment, existing games, especially well-known and popular video games such as Halo®, Call of Duty®, Super Mario Bros.®, etc., can be modified by implementing one or a plurality of different interfaces to the game, including a new user interface controlled by neuromuscular activity. The user interface includes sensors, operating as the game controller, that detect or elicit neuromuscular activity. Similarly, new software routines may be added to existing games to create new levels or sections of the game. Such new routines will appear familiar to the user just like another level of the game.

Additionally, in any of the embodiments related to gaming technology, physical, occupational and/or cognitive exercises can be designed into the game to allow a user to play the game toward a victory or achieve higher or more challenging levels of the game, while at the same time the user is engaging in an enjoyable mode of rehabilitation. Providing such an enjoyable mode of therapy, treatment and exercise will yield results far superior to conventional, repetitious, and boring regimens, as well as results at a lower ultimate cost. For example, an electronic game configured to operate via detection of neuromuscular activity may include physical therapy tasks, occupational therapy tasks, and/or cognitive therapy tasks that must be completed when performing certain gaming actions. For example, in a war game, the game could be configured so that certain gross motor movements (e.g., rising from a sitting to standing position) are required and mapped for performing certain gaming actions (e.g., forcing a character to jump); or the game could be configured so that certain fine motor movements (e.g., moving a finger) are required and mapped for performing certain gaming actions (e.g., forcing a character to shoot an opponent); or the game could be configured so that certain cognitive activities (e.g., determining how many bullets are needed to terminate the enemy based on the number of visible opponents) are required and mapped for performing certain gaming actions (e.g., terminating opponents). In other words, various neuromuscular, physical, occupational, and cognitive activities can be mapped to perform various gaming actions. As will be appreciated by one skilled in the art, numerous examples of physical, occupational and/or cognitive therapy tasks may be designed into a game employing the disclosed system, all of which are considered to be within the spirit and scope of the present invention.

It is envisioned that existing computing devices will be employed with the disclosed system to decrease costs. Preferably, a user may employ the user's own personal computer, tablet, smart phone, game console or other computing device, in order to provide a video depiction to which the user employs sensors, which are able to detect or elicit neuromuscular activity, to cause movement of a cursor, character or other digitally-depicted playing component of the game. A caregiver or treating professional might also have a computing device configurable with software and controllable via sensors, which are able to detect or elicit neuromuscular activity, to be customized to the task. However, custom manufactured computing devices configured to communicate with appropriate sensor technology can also be employed.

Those skilled in the art will realize that other means for interfacing the system and software may be employed and such are anticipated within the scope of this application.

In another embodiment of the disclosed invention, control of an electronic musical instrument (e.g., a musical instrument defined as a Musical Instrument Digital Interface ("MIDI") controller, such as an electronic keyboard) or a computerized non-electronic musical instrument (e.g., a computerized grand piano) is provided utilizing sensors that detect or elicit neuromuscular activity and a user interface controlled by neuromuscular activity. Following system calibration to the user, a user can control such a musical instrument via the user's neuromuscular response. Similar to the embodiments of the invention directed towards the control of electronic games, in the embodiments of the disclosed invention directed towards the control of musical instruments, sensors will be used to detect and elicit neuromuscular activity and, thus, the sensors will be configured to operate as the controller of the electronic or computerized musical instrument.

In the case of a user who has lost the ability to manipulate his or her body to play a musical instrument, the disclosed invention can be adapted to allow the user to play music using an electronic or computerized musical instrument. For instance, if the user is a piano player who has lost the ability to depress the piano keys and/or the sustain pedal of a piano, body-engaged sensors may be worn by or attached to the user and configured with software to allow the user to play an electronic keyboard or computerized piano via detection or elicitation of neuromuscular activity. Neuromuscular activity may be detected via EMG sensors and/or movement sensors worn by the user, and neuromuscular activity may be elicited via e-stim sensors worn by the user. For example, an electronic keyboard could be configured so that neuromuscular activity detected in the user's index finger, having a sensor attached thereto, could be mapped to the depression of a certain key on the keyboard. Likewise, each of the user's fingers, having one or more sensors attached to each finger, could be mapped to the depression of a certain key on the keyboard. In another example, neuromuscular activity detected in the user's calf muscle, having one or more sensors attached thereto, could provide for dynamic control of the keyboard's sustain pedal. Such sensors, capable of detecting neuromuscular activity, could be engaged to any part of the user's body for controlling different keys, pedals or other aspects of the keyboard. Those skilled in the art will appreciate that the possibilities are endless for mapping sensors attached to specific locations on a user's body with the operation of specific keys, pedals, etc. of a keyboard, all of which are considered to be within the spirit and scope of the present invention. In this manner, control of an electronic or computerized musical instrument can be provided by a user interface controlled by neuromuscular activity.

In another mode of the disclosed invention especially designed for users who are gifted in the art of playing a musical instrument, a musical instrument, in conjunction with sensors, may be employed as a controller to interface between the user and a computing device for playing an electronic game. For example, if the user is a piano player who has lost the ability to effectively depress the keys of a piano, gaming software operable via sensors that detect neuromuscular activity, can be configured to re-teach the user to play the piano. The movement of the user's fingers on a musical instrument control, such as a keyboard, in following a video presentation would cause the game or presentation to move forward toward the goal of the game. In such an embodiment, even though the user may not be able to effectively depress the keyboard keys for playing the keyboard, the user would be able to place his or her fingers on the keyboard and limited movements or electrical activity detected by sensors would be sufficient to simulate depressing the keys on the keyboard. Thus, the patient moving his or her fingers on the keyboard would advance along the presented game or video during treatment. In this manner, the system can be especially suited for musicians who are undergoing physical therapy regimens to provide neuromuscular re-education directly related to playing a musical instrument. In such an embodiment, the user can perform exercises for achieving a goal of completing a song or musical scale, wherein the dexterity and limited movements of the user's fingers, hands, and/or arms can be tracked and specifically trained as needed during progress.

In another embodiment of the disclosed invention, a user can manipulate his or her environment (e.g., room lighting, temperature, etc.) using sensors that detect or elicit neuromuscular activity and a user interface controlled by the user's neuromuscular activity. For example, the user can use the disclosed system to turn room lights on and off, or to dim or brighten room lighting. The user can also use the disclosed system to control the temperature setting in a building, such as the user's home. As will be appreciated by those skilled in the art, numerous other environmental settings controlled by a computing device could be manipulated using the disclosed system.

The disclosed system has numerous applications in addition to being used for applications related to gaming, musical instruments, and environmental manipulation. Such additional applications will become obvious to one skilled in the art upon acquiring a thorough understanding of the present invention and are, therefore, considered to be within the spirit and scope of this invention.

Yet another possibility, especially for users who possess an acquired or congenital unilateral injury, is the use of unaffected body parts (i.e., body parts that are not affected by an injury, disability, or impairment) to maximize achievement of therapeutic targets in affected body parts (i.e., body parts that are affected by an injury, disability, or impairment). For example, a user's unaffected and affected muscles and/or nerves can be linked via sensors to games or musical instruments that provide feedback (such as game or instrument response) of the difference between the affected and unaffected sides, and prompt therapeutic gain in the affected side through a competitive spirit and a goal to mobilize and perform as close to the unaffected side as possible. For example, if a user requires rehabilitation of one hand or one leg, a baseline reading of the neuromuscular function of the unaffected hand or leg, using body-engaged sensors, can be taken and used as a reference when performing rehabilitation on the affected body part. Therefore, in use, the unaffected or higher functioning body part may offer incentive to increase neuromuscular function of the affected body part to match the performance of the unaffected body part.

The disclosed system and method use sensors to detect and/or elicit neuromuscular activity in order to control electronic games, musical instruments and environmental settings. By utilizing sensors, which are able to detect or elicit neuromuscular activity, and a user interface controlled by detection of neuromuscular activity, the disclosed device is primarily directed at allowing a user to perform tasks, such as engagement of an electronic game, engagement of an electronic or computerized musical instrument, or manipulation of an environmental setting, that the user would otherwise be unable to perform. Nevertheless, by using EMG, e-stim and/or movement sensors to detect or elicit neuromuscular activity, along with the disclosed user interface to control an electronic game, musical instrument, or environmental setting, the user may realize additional benefits such as neuromuscular functional gain through re-education of the neural system, adaptive neural mapping, increase in muscular control, etc.

Figure 2:
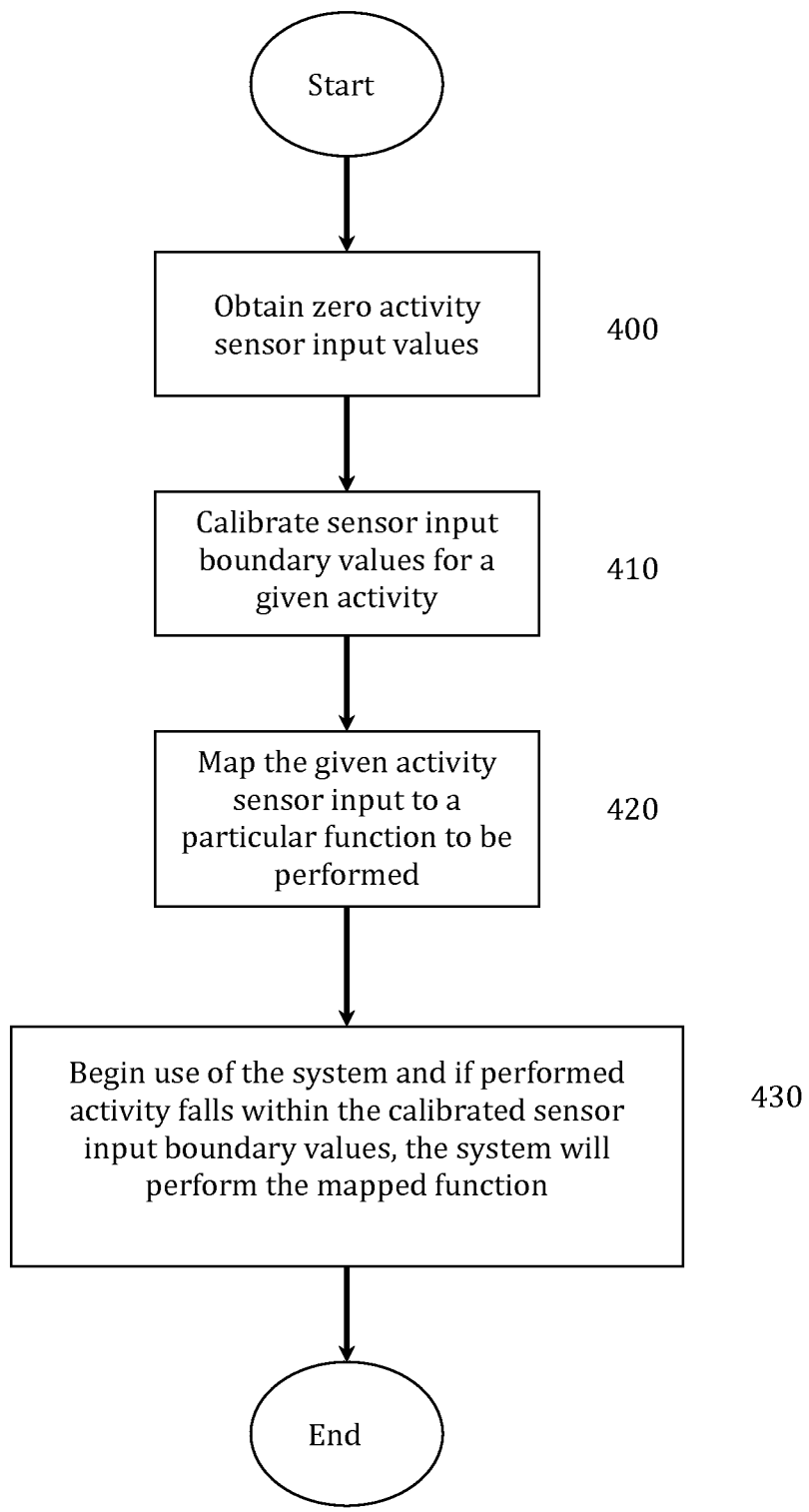
FIG. 2 is a flow chart for setting up and using a system for controlling an electronic game, musical instrument, or environmental setting in accordance with the teachings of the present disclosure.

Referring now to FIGS. 1-2, exemplary embodiments are illustrated of the disclosed system and method for controlling gaming technology, musical instruments and environmental settings via detection of neuromuscular activity. Hereafter, details are set forth by way of example to facilitate understanding of the disclosed subject matter. It should be apparent to a person of ordinary skill in the field, however, that the disclosed embodiments are exemplary and not exhaustive of all possible embodiments.

Now turning to FIG. 1, in one embodiment of the disclosed system, to provide for control of an electronic game, an electronic or computerized musical instrument, or an environmental setting, the disclosed system generally includes a sensor grid 200, a base station 100, and a physical device 300.

The sensor grid 200 is comprised of at least one sensor, to detect or elicit neuromuscular activity or to detect motion, such as but not limited to an electromyography (EMG) sensor 210, a movement sensor 220 such as but not limited to an accelerometer, and/or an e-stim sensor 230. In another embodiment, the sensor grid 200 may be comprised of two or more sensors of the same or of varying types.

In one embodiment contemplated by the present disclosure, multiple EMG sensors 210 are employed to capture multiple neuromuscular activity inputs from various anatomical locations of the user employing the disclosed system. That is, as an example, EMG sensors 210 may be placed on each hand of a user or on each finger of a user's hand to capture the individual neuromuscular activity inputs from each anatomical location.

The base station 100 is comprised of a processor 110, memory 120, and disk space or storage 130. The disk space 130, or persistent storage medium is used for long-term storage of programs, data, an operating system, and other persistent information. In some embodiments, the disk space 130 may be higher latency than memory 120, but may characteristically have higher capacity. In other embodiments, a single hardware device may serve as both memory 120 and disk space 130. The base station 100 may also be comprised of hardware or software interfaces to other components of the system such as the sensor grid 200 and/or the physical device 300. In one embodiment of the disclosed system, the base station 100 is also comprised of software for receiving, storing, and processing the data received from the sensors in the sensor grid 200 as well as using that sensor data for controlling at least one physical device 300 and/or controlling other software residing on the base station 100 and/or physical device 300 such as, but not limited to, gaming software. The base station 100 software may also be comprised of a graphical user interface (GUI) for allowing the user of the system and/or a healthcare provider to calibrate the sensor inputs and map the sensor inputs to particular functions such as, but not limited to, using a foot pedal of a piano or turning a light switch off.

The base station 100 and the sensors in the sensor grid 200 are communicatively coupled 140. This may be accomplished through physical connections (such as cabling) or through wireless connections. In one embodiment of the disclosed system, the communication link 140 is established by the following wireless configuration. For each EMG sensor, a MicroStrain V-Link transmitter (12-pin terminal block, IEEE 802.15.4), an EMG electrode, an EMG transmission cable (to connect the EMG electrode to the MicroStrain V-Link transmitter) is utilized. For each accelerometer, a MicroStrain SG-Link Transmitter (IEEE 8802.15.4) is utilized. One V-Link MicroStrain USB base station receives the wireless signals from the various MicroStrain transmitters. The MicroStrain USB base station connects to the base station 100 by a USB cable.

The physical device 300 may be any physical object that needs to be controlled by the user of the system such as but not limited to piano pedals, piano keys, other musical instruments, gaming systems, gaming controls, light switches, or other environmental settings.

The base station 100 and the physical device 300 are communicatively coupled 150 in the same way as the communication link 140 as has been previously discussed. This may be accomplished through physical connections (such as cabling) or through wireless connections.

Reference is now made to FIG. 2, which depicts a flow chart for setting up and using a system for controlling an electronic game, musical instrument, or environmental setting in accordance with the teachings of the present disclosure. In one embodiment of the disclosed system, an initial setting up and calibration of the sensors is performed. Software residing on the base station 100 reads an initial zero activity sensor input value 400 from the sensor grid 200 after the sensors have been attached to the user of the system. This initial zero activity reading, which is taken when no activity is being engaged in by the user, allows the system to take a baseline reading from the sensors in the sensor grid 200 and also allows the system to filter out any environmental noise from the data coming from the sensors. There are many methods known to those skilled in the art for filtering out environmental noise, all of which are considered to be within the spirit and scope of the present disclosure. In one embodiment of the disclosed system, the data coming from the sensors is a signal having an amplitude measured in milli-amperes versus time measured in milliseconds.

Next, in one of the embodiments of the disclosed system, the sensors are calibrated for activity boundary values 410. As an example, an EMG sensor is attached to the foot of a user of the system. The user attempts to move or thinks about moving the foot, which generates EMG sensor data. For this action, the system will record a minimum and maximum sensor data value and store these readings as boundary values.

In one of the anticipated embodiments, once the zero activity values 400 and boundary values for a given activity 410 are established, the activity is then mapped within the GUI of the software residing on the base station 100 to a particular function 420. That is, when the particular mapped sensor obtains a reading within the calibrated sensor input boundary values, the software performs a particular action 430. This particular action may be to communicate with the physical device 300 or other software to perform an activity such as, but not limited to, making a movement in a game, hitting a note on an instrument, or turning off the light.

Although the invention has been described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and methods and modes of operation of the present invention, it is to be understood, however, that elements of different construction and configuration and other arrangements thereof, other than those illustrated and described, may be employed in accordance with the spirit of this invention. Any and all such changes, alternations and modifications as would occur to those skilled in the art are considered to be within the scope of this invention as broadly defined in the appended claims.

It is important to note that the construction and arrangement of the elements of the system provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other uses, features, modifications and variations are, therefore, considered to be a part of this invention, the scope of which is to be determined by the following claims.

The invention claimed is:

1. A method for controlling devices or software, said method including a system comprising a sensor grid coupled to a user, said system further comprising a base station and at least one physical device or software that is configured to receive instructions from said base station, said method comprising the steps of:

receiving zero activity sensor input values from each of one or more sensors in said sensor grid;

filtering environmental noise from said zero activity sensor input values;

receiving neuromuscular activity inputs from each of said one or more sensors in said sensor grid, wherein said neuromuscular activity inputs are defined as trace motor neuron activity that does not effect muscle contraction;

determining by individual sensor whether said neuromuscular activity input received from each sensor is within a calibrated boundary value for an activity associated with each of said one or more sensors;

and instructing said at least one physical device or software to perform said activity when the neuromuscular activity inputs received from said one or more sensors are within said calibrated boundary value for the activity associated with each of said one or more sensors.

2. The method of claim 1, wherein said one or more sensors comprise at least one EMG sensor.

3. The method of claim 1, further comprising the step of storing said calibrated boundary value as a minimum amplitude value and a maximum amplitude value.

4. The method of claim 1, further comprising the step of storing said calibrated boundary value as a minimum duration value and a maximum duration value.

5. The method of claim 1, further comprising the step of storing said calibrated boundary value as a minimum amplitude value and a minimum duration value, and as a maximum amplitude value and a maximum duration value.

6. The method of claim 1, further comprising the step of using a user interface on said base station to calibrate said one or more sensors and map said one or more sensors to actions to be performed by said base station when said neuromuscular activity inputs are within a minimum value and a maximum value of said calibrated boundary value.

7. The method of claim 1, wherein said one or more sensors comprise at least one e-stim sensor configured to elicit said neuromuscular activity inputs.

8. The method of claim 1, wherein said one or more sensors are incorporated into sensor gear that is engaged with a user's body.

9. The method of claim 8, wherein said sensor gear comprises elastic therapeutic tape having said one or more sensors incorporated within said elastic therapeutic tape.

10. The method of claim 8, wherein said sensor gear comprises upper extremity supports or lower extremity supports attached to a wheelchair, said upper extremity supports or lower extremity supports having sensor components attached thereto.

11. The method of claim 8, wherein said sensor gear comprises an exoskeleton device.

12. The method of claim 1, wherein said one or more sensors are attached directly to a user's body with body adhesives.

* * * * *